(12) United States Patent
Saunderson et al.

(10) Patent No.: US 7,596,614 B2
(45) Date of Patent: Sep. 29, 2009

(54) NETWORK INCLUDING SNOOPING

(75) Inventors: Peter Saunderson, Berkhamsted Herts (GB); John P. Smith, Hazlemere (GB)

(73) Assignee: 3Com Corporation, Marlborough, MA (US)

( * ) Notice: Subject to any disclaimer, the term of this patent is extended or adjusted under 35 U.S.C. 154(b) by 614 days.

(21) Appl. No.: 11/192,774

(22) Filed: Jul. 29, 2005

(65) Prior Publication Data

US 2006/0248229 A1 Nov. 2, 2006

(30) Foreign Application Priority Data

Apr. 27, 2005 (GB) ................... 0508491.8

(51) Int. Cl.
*G06F 15/173* (2006.01)
*G06F 15/16* (2006.01)
*H04W 4/00* (2009.01)

(52) U.S. Cl. .................... 709/224; 709/245; 726/13; 370/338

(58) Field of Classification Search ........................ None
See application file for complete search history.

(56) References Cited

U.S. PATENT DOCUMENTS

| | | | |
|---|---|---|---|
| 6,070,187 A * | 5/2000 | Subramaniam et al. ..... | 709/220 |
| 6,539,019 B1 | 3/2003 | Noy et al. | |
| 7,343,485 B1 * | 3/2008 | Huang et al. ................. | 713/153 |
| 7,356,009 B1 * | 4/2008 | Meier et al. .................. | 370/338 |
| 7,411,925 B2 * | 8/2008 | Nain et al. ................... | 370/329 |
| 2004/0071164 A1 | 4/2004 | Baum | |
| 2004/0111640 A1 * | 6/2004 | Baum .......................... | 713/201 |
| 2005/0264420 A1 * | 12/2005 | Vogel et al. .............. | 340/572.1 |
| 2006/0143440 A1 * | 6/2006 | Ponnapalli et al. .......... | 713/155 |
| 2007/0274321 A1 * | 11/2007 | Jonsson et al. ......... | 370/395.53 |
| 2008/0151906 A1 * | 6/2008 | Kolli et al. ............. | 370/395.31 |

OTHER PUBLICATIONS

Search Report for Application No. GB0508491.8, Aug. 3, 2005.
Configuring DHCP Snooping, Chapter 19, Catalyst 4500 Series switch Cisco ISO Software configuration guide—Release 12.1(13)EW, May 15, 2003.

* cited by examiner

*Primary Examiner*—Wen-Tai Lin

(57) ABSTRACT

A computer network including:
at least one switch connecting at least one edge device to the remainder of the network, said at least one switch including:
snooping apparatus using DHCP to monitor the signal traffic through the switch to or from the each edge device to determine, without changing the traffic signals, for each edge device, the MAC address, the IP address, and the port of the switch to which it is connected, and
a dynamic table within said switch of, for each edge device, the MAC address, the IP address, and the port which it is connected, the contents of the table being provided by said snooping apparatus.

20 Claims, 4 Drawing Sheets

NETWORK INCLUDING SNOOPING

BACKGROUND OF THE INVENTION

The present invention relates to a network including snooping which may be DHCP (Dynamic Host Configuration Protocol) snooping.

DHCP snooping can be provided in a network to monitor and hence control the network in a variety of ways, and in particular to control illegitimate use of the network and to control QoS (quality of service) access of devices to the remainder of the network.

Many large organisations, such as corporations, universities, schools, libraries have large computer networks which allow ready physical access to the network by members of the public or students or employees or contractors. It is clearly desirable to control the access of individuals to the network both to prevent unauthorised action by the user and to provide more simple and efficient access to the network.

Thus, for example, it is desirable to prevent someone in such an environment attaching their computer to the network, for example in a docking station and taking control of the network in an undesirable manner. Such a user might try to use an unauthorised, IP address which would deny access to someone else with the same IP address. They might try to flood the network with undesirable data. They might also use the network to gain access to other devices, and they might try to take control of the servers of the network.

Furthermore, some types of device, for example IP phones, require a different type of service to a computer and it is useful to be able to determine whether a phone or a computer is connected to a network at a particular port and to appropriately direct the traffic to a further particular port.

WO 2004/042999 (Ericsson) discloses a method and arrangement for preventing illegitimate use of IP addresses in which when a subscriber requests an IP address it is checked that it is a DHCP message with valid subscriber values and a message from the subscriber with a false IP addresses is discarded by a filter.

SUMMARY OF THE INVENTION

The present invention provides, according to a first aspect, a computer network including:

at least one switch connecting at least one edge device to the remainder of the network, said at least one switch including:

snooping apparatus using DHCP to monitor the signal traffic through the switch to or from the each edge device to determine, without changing the traffic signals, for each edge device, the MAC address, the IP address, and the port of the switch to which it is connected, and a dynamic table within said switch of, for each edge device, the MAC address, the IP address, and the port which it is connected, the contents of the table being provided by said snooping apparatus.

The present invention provides, according to a further aspect, a computer network including:

at least one switch connecting at least one edge device to the remainder of the network, said at least one switch including:

snooping apparatus using DHCP to monitor the signal traffic through the switch to or from the each edge device to determine, without changing the traffic signals, for each edge device, the MAC address, the IP address, the VLAN, and the port of the switch to which it is connected, and a dynamic table within said switch of, for each edge device, the MAC address, the IP address, the VLAN to which the edge device is to be connected, and the port which it is connected, the contents of the table being provided by said snooping apparatus.

Preferably the switch contains a Network Login (by which we mean in this specification the use of IEEE 802.1x protocol to provide port based access control) and a MAC address based device authentication protocol such as RADA (RADIUS Authenticated Destination MAC Address) based authentication protocol engine and detects the user name and the user name is added to the dynamic table.

In a preferred arrangement, the switch operates in level 2 of the OSI model.

The table is referred to as dynamic because entries in the table can change automatically. For example, some data entries in the table can be only retained for a defined limited time and then discarded. New edge devices (e.g. when a new edge device is connected to the switch) can be snooped using DHCP and added to the table without intervention of the network manager. Thus the content and size of the table can change over time to include only that data which is currently required.

The computer network may also include a server, which includes a table of user names and their relevant passwords used by Network Login. The User and Password information may also be configured as the MAC address of an authorised attached device used by RADA.

The information in the table of the switch may be accessed by a management apparatus controlling the network, via a management interface such as SNMP.

The edge device may comprise a work station or a computer, but may also comprise in addition to a computer an IP phone with the computer connected through the phone or a computer running IP phone software. The switch may, via the use of the table, control access of said computer and IP phone to different output ports suitable for the purpose.

The use of this arrangement allows, for example, in schools, universities or commercial enterprises, control of the network by snooping at the switch attached to the edge devices, one may control the access of each actual device to the remainder of the network. Thus, for example, if by using snooping the incorrect IP address is used then the access can be prevented. If RADA or Network Login detect the incorrect user ID or passwords are provided then, then access can be prevented. This can stop unauthorised access of an edge device to the remainder of the network or from one edge device to another edge device.

The arrangement may also be provided to provide a desired QoS (quality of service) for a particular edge device which can allow access of a particular edge device to specific parts of the network or, for example, the RADA authentication can identify edge devices that must have access to the IP phone call system and the DHCP snooping can identify IP phones that must have access to the IP phone call system. Other edge devices can be prevented from accessing the internet using the results of the RADA, Network Login authentication.

BRIEF DESCRIPTION OF THE DRAWINGS

The preferred embodiments of the invention will now be described by way of example only with reference to the accompanying drawings in which.

DETAILED DESCRIPTION OF PREFERRED EMBODIMENTS

The preferred embodiment of the invention provides for control of access to a computer network by the automatic configuration of a dynamic table including IP access control lists, Voice VLAN membership and Voice QoS profile traffic classification for a switch port using information derived from the monitoring of DHCP traffic. Data/Voice Vlan and Data/Voice QoS profile traffic classification for a switch port information derived from the RADA and Network Login processes. This allows a layer 2 or layer 3 switch to use the table derived from the information learnt from DHCP packets passing through the switch between an attached DHCP client (an edge device connected to a port of the switch) and a DHCP server. The algorithms use DHCP snooping and RADA/Network Login to provide additional network control to the administrator.

Figure 1:
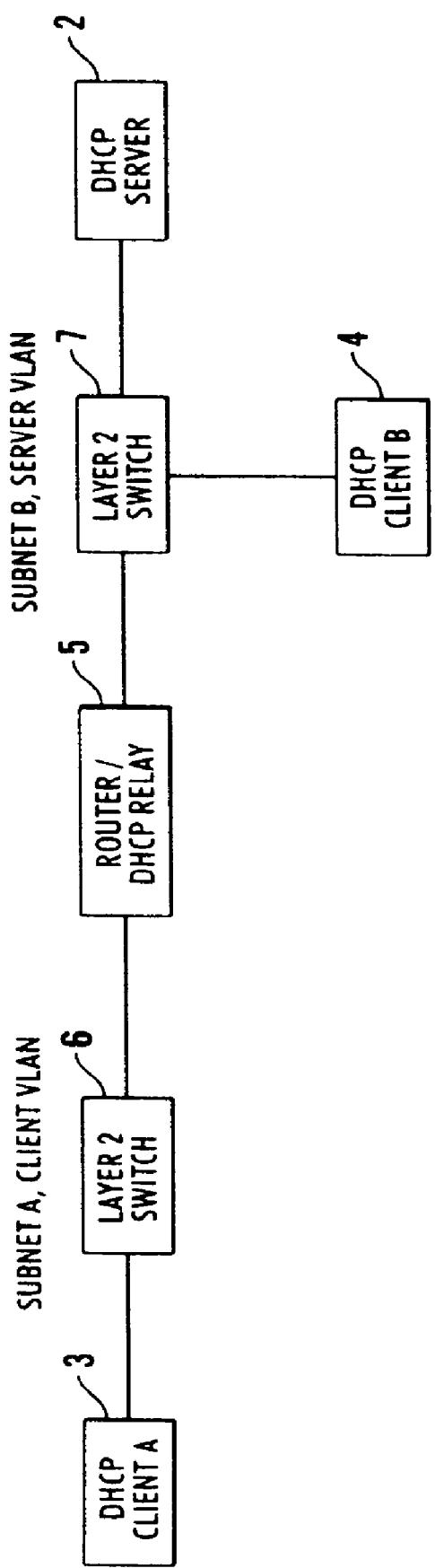
FIG. 1 is a diagrammatic layout of a network illustrating the use of a DHCP server.

Referring to FIG. 1, a DHCP server 2 is a network device used to assign IP addresses automatically to network attached devices (DHCP client A—reference numeral 3—or DHCP client B—reference numeral 4). The DHCP server 2 maintains a table that contains the IP addresses, IP Interface (effectively the subnet or VLAN that the device is connected to) and MAC address of devices on the network. The IP addresses are assigned such that in any one network each client (device) is allocated a unique IP address from the allowed range of adminstrator configured IP addresses for each subnet. When the DHCP client and the DHCP server devices are on the same network the DHCP client (such as DHCP Client B) packets are broadcast to the DHCP server. When the DHCP client and DHCP server devices are on different IP subnets (such as DHCP Client A) the broadcast packets from the DHCP client can't reach the DHCP server directly. The DHCP traffic sent between the DHCP server and the client A devices has to pass through an IP router (or layer 3 switch 5) using a DHCP/BOOTP traffic relay agent. The action of the DHCP relay agent is to snoop on the DHCP traffic (on subnet A), add the routers IP Interface details for subnet A to the DHCP packet and then forward the DHCP traffic between the subnet with the DHCP client attached to the subnet with the DHCP server attached so that one DHCP server can be used to allocate IP addresses from the correct range of available IP addresses for many network attached devices across several subnets. DHCP responses containing the allocated IP addresses are forwarded in the opposite direction from the DHCP server 2 either directly to the clients on the same subnet (client B) or via the relay function in the router that will use the IP Interface details from the DHCP response to forward the response to the correct destination subnet. The MAC address stored in the table may be used to ensure that the client gets the same address the next time it makes a request of the DHCP server (unless the client has changed to a different subnet) to ensure that the available IP addresses are not exhausted.

The algorithms in this specification show how this DHCP snooping technology can be extended, and combined with other networking technologies used in layer 2 switches to provide additional security to the network and prevent unwanted network traffic from interfering with the operation of the network. The details of the DHCP snooping technology are presented hereafter under the title "DHCP Snooping".

As already described, one common problem is for some unauthorised network attached devices to be connected in the network with a fixed IP address that conflicts with a DHCP allocated address thereby creating a problem where two attached devices have the same IP address and neither device can function correctly. This problem can be prevented by the preferred embodiment of the invention using the IP address learnt from a DHCP response and the MAC address learnt from the DHCP packets to allow all packets with this MAC address and IP address to be sent to the network and to prevent any packets from a different IP address from entering the network. The detailed algorithm is presented hereafter under the title "Auto IP Access Control List Using DHCP snooping". Operation of this feature on a port is compatible with port security configuration options including IEEE 802.1X port based access control (Network Login) and MAC-address based port security (RADA).

A second application for the DHCP snooping technology of the preferred embodiment of the invention is for the voice over IP technology used in many networks today. The voice over IP phone packets need to be sent on a separate network with higher priority to ensure that the voice traffic does not suffer from unnecessary delays in the network. To achieve this the voice over IP phone will learn its IP address and VLAN to use for voice traffic using DHCP. The ethernet switch that the voice over IP phone is connected to can use DHCP snooping to learn the IP address of the phone and the VLAN that the phone is going to use on the network. The switch can then configure this VLAN to the port that the phone is connected to and can also use GVRP to configure the VLAN to other ports and switches in the network that have this VLAN configured. The detailed algorithm is presented hereafter under the title "Auto Voice VLAN learning using DHCP snooping".

A third application for the DHCP snooping technology of the preferred embodiment of the invention is in conjunction with RADA/Network Login and the QoS applications where specific rules are created in the switch to cause specific traffic flows to have different characteristics in the network. The QoS rules can be applied to a port to scan for particular IP and MAC addresses to ensure that the traffic flow from these devices gets a particular QoS. RADA and Network Login provide the QoS rules, the DHCP snooping technology allows the MAC address and IP address of a particular flow to be learnt by the switch. This in turn allows the QoS rules to be applied specific to this IP and MAC address.

An example of the use of this in a real network is to allow the administrator to ensure that the voice traffic from a PC running IP phone software is allowed access to the network and in particular the IP Phone call system. The PC phone is indistinguishable from a normal Data PC. However the administrator configures the PC and in particular the PC MAC address into the IP Phone Call system. RADA can be used to identify the PC running IP phone software, it provides the QoS rules for data and voice, DHCP snooping provides the IP address of the PC and allows the QoS rules to explicitly allow this PC access to the IP Phone Call system (the IP address of the PC and the IP address of the call centre can be used to allow traffic from this PC to the IP Phone call system, whilst blocking any other PC IP address from gaining access to the IP phone call system.

Figure 2:
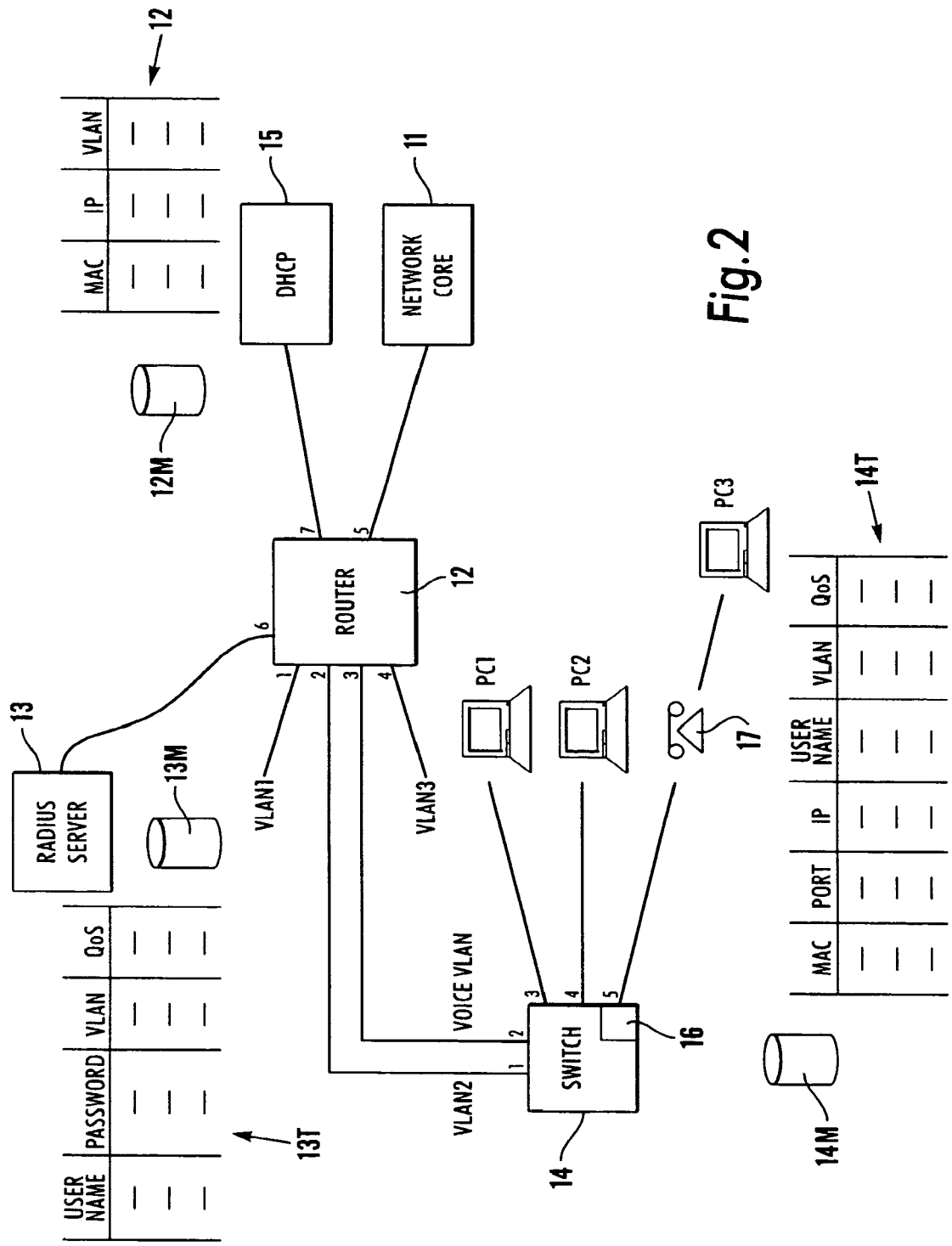
FIG. 2 is a diagrammatic layout of a network including a preferred embodiment of the invention.

We will now describe a network incorporating a preferred embodiment of the invention in FIG. 2. Referring now to FIG. 2, there is shown a network 10, the majority of the network 10 being indicated by the network core 11. Network core 11 is connected to a router 12 which in turn is connected to a server referred to as a radius server 13 and a DHCP server 15.

The DHCP server 15 includes a list of MAC address or MAC address OUI's configured by the administrator associated with the IP phone network. When one of these devices requests an IP address from the DHCP server the DHCP server responds with the IP address for the appropriate IP Interface and in addition the VOICE VLAN configuration in the DHCP responses to the attached device. The simplest implementation of this is to provide this VOICE VLAN information in all DHCP responses. Only devices that understand this information will use it. A more secure implementation will only send the VOICE VLAN information to devices whose MAC address and MAC address OUI have been configured in the DHCP server. A larger configuration may require more than one VOICE VLAN to be configured. The VLAN information will include an indication of the tag state required for the port. A VLAN tagged port ingresses and egresses packets that have an additional VLAN tag added to the packet as defined in IEEE 802.1. An untagged port requires the switch to take untagged packets on ingress and tag them internally with the VLAN tag information and remove the VLAN tag on egress.

Various ports of the router 12 are connected to different lines, for example, port 1 is connected to VLAN 1, port to 2 to VLAN 2, port 3 to VOICE VLAN, and port 4 to VLAN 3. The lines VLAN 2 and VOICE VLAN are connected to ports 1 and 2 respectively of a switch 14 which includes a DHCP snooping apparatus 16. Switch 14 is connected to a plurality of edge devices PC1-3 and 17. Thus ports 3 and 4 are connected respectively to workstations or computers PC1 and PC2. Port 5 is connected to an IP phone 17 and to a workstation or computer PC3. A simplification of this physical network would be to use tagged VLANs on the router 12 ports 2 and 3 and switch 14 ports 1 and 2 such that one physical port carried both VLAN2 and VOICE VLAN traffic using the IEEE802.1 VLAN tag to multiplex and de-multiplex the two VLAN flows.

The radius server 13 includes a memory 13M including a table 13T of information about each relevant user (i.e the person using the device corresponding passwords, the VLAN the relevant user may be connected to, and the QoS for that user.

The router 12 includes a memory 12M which includes an ARP table 12T of information about each device (rather than the user). Thus the table 12T includes a list of MAC addresses, corresponding IP addresses for the relevant device, and the IP Interface the relevant device may be connected to. The router 12 has several IP Interfaces one or more of which can be associated with each VLAN. The router 12 also contains sufficient information to route packets received from any of these IP Interfaces towards the packets destination over a second IP Interface. The router 12 also contains an administrator configured DHCP relay function that will take DHCP packets received on one of the IP interfaces and relay these packets towards the DHCP server. With this information the router 12 can be configured to keep the traffic from the VOICE VLAN(s) separate from the other VLAN traffic only allowing specific important traffic (such as DHCP IP address allocation packets and PC Phone traffic from voice enabled PC's) to flow between the VOICE VLAN and other VLANs.

Switch 14 includes a memory 14M to contain a dynamic table 14T of information about the edge devices and users connected to the switch 14. The table 14T includes a list of MAC addresses for the relevant edge devices, and for each device the port to which it is connected, its IP address, its user name, the VLAN to which it is to be connected and the QoS to which it is entitled.

Referring to FIG. 2, when a new edge device, for example, PC1 is connected to an edge port (in this case port 3) of switch 14 the DHCP snooping apparatus 16 monitors the signal traffic from PC1 through the switch. The snooping apparatus 16 does not alter or change the traffic signal but simply snoops on the traffic signal. As a result of that snooping process, the snooping apparatus 16 is able to determine for the PC1 one or more of the MAC address, the IP address, the port of the switch to which it is connected. This data is passed to the table 14T stored on the memory 14M. The software of the snooping apparatus maintains the data in the table, for a predetermined period of time. For a particular entry, if the entry in the table is not refreshed, then it will be deleted after a predetermined period of time. In this way the table 14T maintains an up-to-date table of data relating to the edge devices connected to the switch 14.

The switch 14 also includes a table of allowed DHCP server IP addresses. When DHCP servers are detected as connected to a port on the switch by the snooping apparatus the actual DHCP server addresses are looked up in the table of allowed DHCP server IP addresses and if the address is not found then packets from this rogue IP address are discarded at that switch port thereby denying access to the network to rogue DHCP servers.

If the device connected to the switch includes, for example, a second device such as an IP phone 17, then the snooping apparatus determines, for that edge device, the MAC address, and the VLAN to which the edge device is to be connected. In this way the switch 14 is able to connect, for example, the IP phone 17 to port 2 (VOICE VLAN) and the PC3 to port 1 (VLAN 2). In addition to the above, the snooping apparatus detects the user name for each device.

We will now describe the algorithms utilised by the snooping apparatus 16 to provide the snooping arrangement of the invention.

DHCP Snooping

This feature snoops on DHCP traffic passing through the switch 14. This feature will operate regardless of whether the switch 14 is also configured to act as a router or as a router and DHCP relay. The DHCP snooping operation in the switch operates on each port such that the devices connected to each port are determined by looking at the source MAC address included in the DHCP packets received on the port.

Operation of this feature is configurable independently on each port on the switch 14 via management interfaces such as SNMP, CLI and Web interfaces. The number of DHCP clients (i.e. edge devices) supported on each port is configurable by the administrator. When a new DHCP client is detected on a port with the maximum number of current clients then an event report/trap is generated and one of the following actions will be taken based upon a configuration choice:

1. The new client is ignored.
2. The new client replaces the oldest client.

A new client is detected by snooping on DHCPDISCOVER, DHCPREQUEST and DHCPINFORM messages passing between the client and the switch 14 and examining the client hardware address (MAC address) contained in the DHCP packet header and the ingress Ethernet port and VLAN. The client configuration parameters, such as the allocated IP address and allocated VLAN (if present), are learnt from the DHCPACK message, which must contain a transaction identifier that matches with the transaction identifier in the last DHCPREQUEST or DHCPINFORM message received from the client. Information learnt from the DHCPACK message is subject to a timeout based upon the lease time included in the DHCPACK message plus five minutes to account for any clock drift or delay during the lease extension processing. The learnt information shall also be removed when a DHCPRELEASE or DHCPDECLINE message is received from the client or a DHCPNACK message is received from the server.

If the client configuration parameters are not learned within five minutes then the client entry is deleted.

A configuration option controls whether the client information is deleted when a link state changes to down; the default behaviour is for the client information to be maintained when the link state changes.

Configuration parameters supplied by the DHCP server are stored in non-volatile storage (memory 14M), hence following a switch reboot the network services will be restored.

A user interface to the switch 14 allows the client information learnt from the DHCP packets (table 14T) to be made available to the administrator to allow network diagnostics and debug operations to be carried out (ie display the entries learnt from DHCP snooping and allow the entries to be deleted or created by the administrator as necessary).

When the switch 14 is acting as a DHCP relay then a single DHCP server on one VLAN (called here the server VLAN) is being shared between a number of different clients connected to the same VLAN or to different VLANs (called here client VLANs). The DHCP packets are snooped as described above on all the VLANs and if necessary they are passed onto the DHCP relay function that will send these packets out onto the server VLAN to ensure that they reach the DHCP server. Reply packets from the DHCP server then get distributed from the server VLAN to the various client VLANs.

When the switch is not acting as the DHCP relay for the network then the DHCP packets are forwarded normally within the client VLAN and also are snooped by the switch. The snooped DHCP packets are not relayed to a different VLAN, they are discarded once they have been processed by the snooping algorithms.

Auto IP Access Control List Using DHCP Snooping

The switch software in the DHCP snooping apparatus 16 supports Automatic IP Access Control List configuration. This feature ensures that end stations using IP addresses not allocated by a DHCP server do not gain access to the network.

Basic Automatic IP Access Control List configuration

When this mode of operation is configured on the relevant port of switch 14 then all ingress IP traffic with an unknown source IP address apart from DHCP and ARP (Address Resolution Protocol) traffic (identified by the DHCP server UDP port number and the ARP Ethernet type and source MAC address) is filtered from the port. When an end station (e.g. PC1) is connected to the port then the DHCP traffic is snooped by the snooping apparatus 16 of the switch 14 to determine the IP address allocated to the connected end station. The IP address learnt from snooping on DHCP traffic is configured in the Access List rules to allow IP traffic from this address to access the network. In order for the end station to access other hosts the switch port must also be configured to allow ARP traffic to be forwarded.

An event report/trap is generated when the IP Access Control List is changed on a port via management interfaces such as SNMP to enable the network management station to track and monitor changes to the users and devices logged onto the network.

DHCP Snooping Assisted ARP Traffic Filtering

To provide better protection the ARP traffic should also be filtered based upon the MAC address and, when it has been learned from the DHCP snooping, the IP address. This extension of the Basic Automatic IP Access Control List provides further protection against rogue network attached devices. The MAC/IP address pair is unique for a particular network attached device. This MAC/IP address binding is learnt from the DHCP traffic and confirmed by the first ARP packets sent by the legitimate network attached device.

Gratuitous ARP Handling for DHCP Allocated Client IP Addresses

Some network attached devices may change the MAC address used in the IP packets that it sends. These devices will send out a "Gratuitous ARP" response to update the ARP table 12T of any attached device. This update is not relayed to the DHCP server and is not taken into account by the DHCP server IP address allocation algorithms. In addition a rogue network attached device may use this technique or Gratuitous ARP to take control of the IP address of the legitimate network attached device. Thus when the switch detects the presence of Gratuitous ARP responses attempting to change the IP/MAC address binding one of a number of configurable intrusion action must be taken:

Allow the MAC/IP address binding to be changed and send a trap

Prevent the MAC/IP address binding from being changed and discard all packets with the new MAC address on the port and send a trap Block all traffic from the port and send a trap This extension of the Basic Automatic IP Access Control List provides further protection against rogue network attached devices.

Detection and Isolation of Rogue DHCP Servers

The network administrator typically configures all the ports (e.g. ports 3, 4, 5 of switch 14) directly connected to edge devices ("edge ports") with this Auto IP Access Control List feature. The ports that are connected into the core of the network (e.g. ports 1, 2 of switch 14) will not have this configuration to allow normal packet flow on these "trusted" ports.

We provide a means of detecting the presence of rogue DHCP servers on the "edge ports". The DHCP snooping feature snoops on all DHCP packets and the source physical port for each packet is recorded. The switch determines if the packet came from a DHCP server by comparison of the source UDP port number with the standard DHCP source UDP port. Having located all the packets with matching DHCP UDP source port the switch checks the DHCP server list to determine if this is a valid DHCP server. The administrator can optionally configure the list of "allowed DHCP servers" all packets from DHCP servers that are not in the "allowed DHCP server" list are treated as "rogue DHCP servers". If the source physical port has the rogue DHCP server feature configured then one of the following intrusion actions can be configured on the ports configured:

Allow the new DHCP server access to the network and send a trap

Discard all packets from the new DHCP server on the port and send a trap

Block all traffic from the port and send a trap

Prevention of Rogue Traffic from the Network Core

A further problem which may be dealt with is in respect of packets being sent from the core of the network to the rogue IP address. Consider a rogue network attached device connected to subnet A. Traffic from subnet B directed to the rogue IP address would pass through the router but no ARP table entry for the rogue device would exist so this traffic would be processed by software in the router that would attempt and fail repeatedly to obtain an ARP table entry for the rogue device. These packets can be blocked at the router port using a rule to drop packets to any IP address that has not been allocated by DHCP. This additional ARP packet processing is performed by an additional optional test in FIG. 3 step 115. The test is to see if the packet type is an ARP request type packet. If it is then the IP address will be a known dynamic IP address or is a known static IP addresses that has been configured in the dynamic table by the administrator. This reduces the number of ARP packets that would otherwise be sent to the client VLANs. This additional protection would require that the administrator could add any specific IP address ranges that were outside the DHCP auto allocated range to allow static allocated IP addresses to be used on the client VLANs. The administrator configured allowed IP address range is built into the rule such that all packets with a destination IP address within the administrator allowed static IP address range and all packets with a destination IP address allocated by DHCP are allowed to pass to the edge of the network. This additional rule could be applied to the "trusted" ports in the network.

Auto Voice VLAN Learning Using DHCP Snooping

The switch 14 supports automatic Voice VLAN learning by snooping on the DHCP traffic used to assign the Voice VLAN to the phone.

Basic Operation of Auto Voice VLAN Learning

When auto voice VLAN learning is configured on the port 5 of switch 14 attached to PC3 and IP phone 17, the learned Voice VLAN is applied to the switch port as a tagged member only if the VLAN has been administratively configured on the switch and has been administratively configured to an uplink port to allow the voice traffic to flow into the core of the network. The Voice VLAN assignment shall operate independently of any automatic VLAN assignment from the RADIUS server or administratively assigned VLAN such that the actual port VLAN membership will be the combination of all of the assigned VLANs.

The learned Voice VLAN is maintained across a switch reset. The learned Voice VLAN is deleted if the lease time associated with the DHCP client allocation expires or the feature is disabled on the port or if the VLAN is deleted from the switch. The learned Voice VLAN must not be deleted when the client releases the address unless the DHCPRELEASE is received on the Voice VLAN. This is necessary since the IP phone will initially be allocated an IP address, and be assigned the voice VLAN, on the default port VLAN after which it will release the original IP address and then allocate a new IP address on the voice VLAN.

When a new Voice VLAN is learnt on a port an event report/trap is generated via management interfaces such as SNMP to enable the network management station to track and monitor changes to the users and devices logged onto the network.

Auto Configuration of the Voice VLAN on Uplink Ports

The GVRP protocol may be used in conjunction with the DHCP snooping algorithms to ensure that the voice VLAN is correctly assigned to the uplink ports connecting the edge switch to the rest of the network. Once the voice VLAN is learnt from the DHCP snooping and applied to the voice over IP port, then the periodic GVRP Join messages are sent by the switch to all ports to ensure that any other system connected to this voice VLAN will join the same VLAN. When all the voice VLAN ports are removed from the switch then the GVRP Join messages for the voice VLAN cease and the voice VLAN will be disconnected from the uplink port.

The administrator does not then need to manually configure the voice VLAN in the switch.

Auto QoS Traffic Classification Using DHCP Snooping

The switch 14 supports automatic configuration of port QoS rules that include either the MAC address or the IP address of an attached device that has a DHCP allocated IP address. This feature ensures that only devices with a DHCP allocated IP address receive the configured services.

When this feature is configured on a port the assigned QoS rules are derived from template rules that are modified to specify the IP and MAC address learnt on the switch port. The assigned QoS rules are removed when the client releases the IP address allocation or when the time lease associated with the DHCP allocation expires or the feature is disabled.

The template rules are identified in the QoS profile for the port by having an all zero MAC address or IP address. Any other rules in the QoS profile are assigned to the port regardless of whether there are clients with allocated IP addresses attached to the port. This feature will support modification of both administratively assigned and RADIUS assigned QoS profiles.

The effect of this is to allow the administrator to tailor the QoS rules applied to a switch port to include the IP and MAC address of the network attached device that are learnt from DHCP snooping at the time when the network attached device is used on the switch port. In addition the user that logs onto the network using RADIUS Network Login or RADIUS Authenticated Login based on MAC address may be provided with QoS rules specific to the IP and MAC address that they are using at the time. When the same user logs onto the network on a different switch with perhaps a different network attached device they can be provided with the equivalent QoS rules applied but using the MAC and IP address learnt for the new network attached device.

Figure 3:
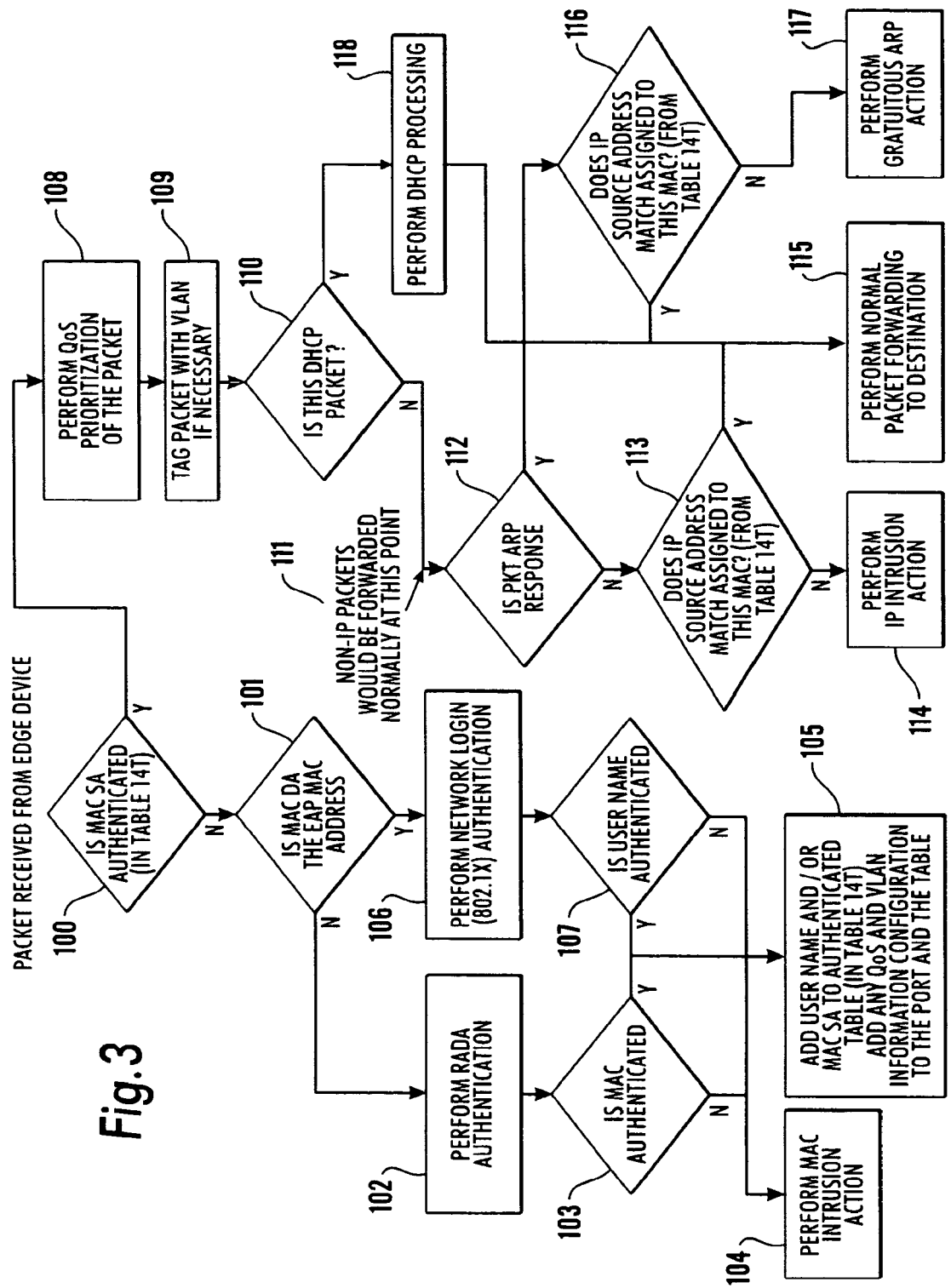
FIG. 3 is a flow diagram of the method of a preferred embodiment of the invention when a packet is received from an edge device.

We now refer to FIG. 3 which shows the method steps followed when a data packet is received from an edge device such as IP phone 17 or one of the PCs 1-3.

Thus the steps are:

Step 100: is MAC SA (source address) authenticated (i.e is it in table 14T14T)? If NO go to Step 101, if YES go to Step 108.

Step 101: Is MAC DA (destination address) the EAP MAC address? If NO go to Step 102, if YES go to Step 106.

Step 102: Perform RADA authentication and go to Step 103.

Step 103: Is MAC authenticated? If NO go to Step 104, if YES go to Step 105.

Step 104: Perform MAC Intrusion Action.

Step 105: Add User Name and/or MAC SA to Authenticated Table (in table 14T14T) Add any QoS and VLAN information configuration to the port and the Table 14T14T.

Step 106: Perform Network Login (802.1x) Authentication and go to Step 107.

Step 107: Is User Name Authenticated? If YES go to Step 105, if No go to Step 104.

Step 108: Perform QoS prioritization of the packet and go to Step 109.

Step 109: Tag the packet with VLAN information if necessary and go to Step 110.

Step 110: Is this packet a DHCP Packet? If NO go to Step 111, if YES go to Step 118.

Step 111: Is it an IP packet? If NO, forward packet normally to destination at step 115, if YES, go to step 112.

Figure 4:
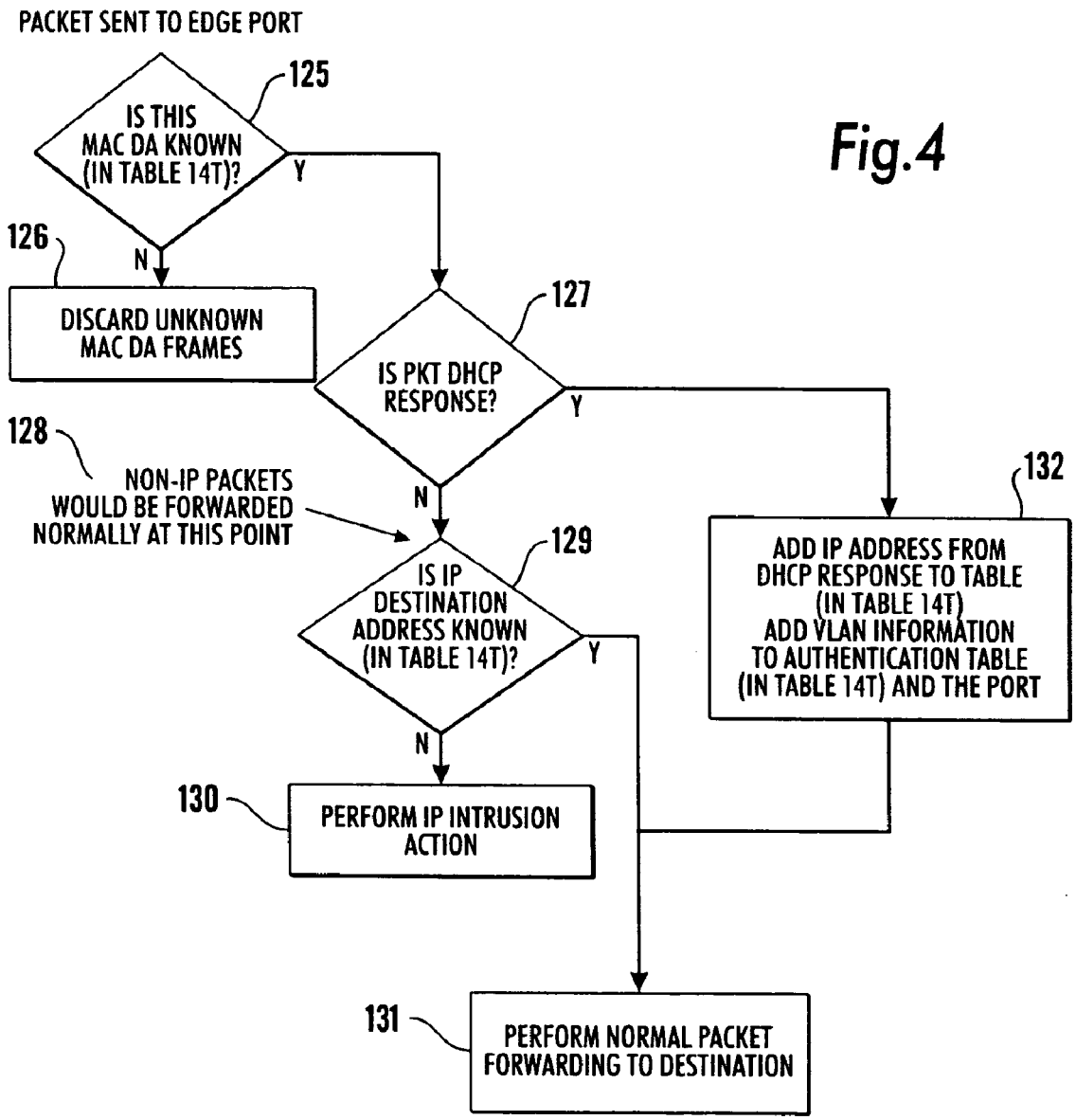
FIG. 4 is a flow diagram of the method of a preferred embodiment of the invention when a packet is sent to an edge port.

Step 112: Is packet an ARP Response? If NO go to Step 113, if YES go to Step 116.
Step 113: Does IP source address match the IP address assigned to this MAC in Table 14T14T? If NO go to Step 114, if YES go to Step 115.
Step 114: Perform IP Intrusion Action.
Step 115: Perform normal packet forwarding to destination.
Step 116: Does IP Source address match the IP assigned to this MAC in Table 14T14T? If YES go to Step 115, if NO go to Step 117.
Step 117: Perform Gratuitous ARP Action.
Step 118: Perform DHCP Processing and go Step 115.
Similarly, FIG. 4 shows the method steps carried out when a data packet is sent to an edge port (e.g. ports 3, 4, or 5 of switch 14.
Step 125: Is this MAC DA (destination address) known in table 14T14T? If NO go to Step 126, if YES go to Step 127.
Step 126: Discard Unknown MAC DA frames.
Step 127: Is the packet a DHCP Response? If NO go to Step 128/129, if YES go to Step 132.
Step 128: Is the packet an IP packet? If NO forward the packet normally to its destination, if YES, go to step 129.
Step 129: Is IP Destination Address known (in table 14T14T)? If NO go to Step 130, if YES go to Step 131.
Step 130: Perform IP Intrusion Action.
Step 131: Perform normal packet forwarding to destination.
Step 132: Add IP address from DHCP response to table (in table 14T14T) Add VLAN Information to Authentication Table (in table 14T14T) and the port and go to Step 131.

Steps 110, 118, 127 and 132 above provide the DHCP snooping.

Referring more generally to FIGS. 3 and 4, when data from an edge device is received at step 100, the data is interrogated for the MAC address of the edge device and that is then checked against the MAC addresses in the table 14T.

In most cases the MAC address will appear on the table 14T14T and so the steps 108-117. are performed, that is the information regarding QoS prioritization is performed is step 108 and the relevant VLAN which appears against the MAC address in table 14T14T is added if necessary in step 109. If the data packet is a DHCP packet, then DHCP processing is carried out in step 118 and the data packet is forwarded to its destination in step 115. If the packet is not a DHCP packet, then if it is a non-IP packet it will be forwarded to its destination, but if it is a IP packet (determined at step 111), then it is examined in either step 113 or step 116 (depending upon whether the packet is a ARP response in step 112) to determine whether the IP source address matches that assigned to the particular MAC address in the table 14T and if it is the packet is forwarded normally, and if it is not some kind of alternative action is taken in steps 114 or 117. Thus, if the IP address and MAC do not agree as set out in table 14T, the packet is not forwarded.

Retuning now to step 100, in some cases the MAC address will not be authenticated in table 14T and in that case, depending upon whether the MAC DA is an EAP MAC address, performs a relevant authentication. This is either a RADA authentication in step 102, or a network login authentication in step 106, and if either the MAC address or the User Name is authenticated in steps 103 or 107 then the User Name or MAC address is added to the table 14T. If the MAC address or User Name is not authenticated then the data packet is not forwarded but an intrusion action is taken in step 104.

In FIG. 4 we deal with the situation where the data packet is sent to the edge port. If the MAC DA is not known from table 14T then the packet is discarded. If it is known, then in step 127 it is determined whether the packet is DHCP response and if it is, the IP address is added from Table 14T in step 132, and the relevant VLAN information is added to the table 14T and the port.

If the packet is not a DHCP response, then it is determined in step 129 if the IP destination address is known from table 14T and if it is, the packet is forwarded normally to the destination and if it is not in step 130 the packet is not forwarded and an intrusion action is performed.

We will now refer to some particular features which apply to the use of IP phones such as the phone 17 of FIG. 2.

As is known, devices in a network each have a MAC address which consists of 6 bytes.

IP phones, or at least IP phones of a particular manufacturer, will have the same sequence of 3 bytes in their MAC address which is known as the Organisation Unique Identifier (OUI). It is therefore a simple matter for a DHCP server, router or switch to identify a data packet coming from an IP phone of that manufacturer, since they will always carry the unique 3 bytes.

IP phones are easy to identify on a network based on the OUI of the SA (Source address) MAC address. Packets from an IP phone can self authenticate based on the OUI and can be used given the appropriate QoS and network access (i.e to VOICE VLAN although more than one VOICE VLAN may be provided)). The DHCP packets can be used to identify the VLAN information that needs to be configured on the port to allow the IP phone to connect to the relevant VOICE VLAN.

PC based phones (i.e phones that form part of a PC itself, using a microphone and speaker connected directly to the PC) are more difficult to identify. The PC will be passing both data and voice traffic and it is difficult to separate out these two forms of traffic on the network. The preferred embodiment of the invention described provides a mechanism to perform this separation as follows:

The administrator typically configures the MAC address of the PC (PC2 FIG. 2) in an IP Phone (pcXset) software and an IP Phone Exchange unit (NBX) to enable the PC IP Phone software to be identified as a specific extension number. The system uses the MAC address as a fixed identity to ensure that the same extension number is provided to the PC each time the IP Phone software is started.

The administrator can configure the MAC address of the PC configured with IP Phone software in the RADIUS server and provide a VLAN and QoS profile that matches the mixed voice data traffic that the PC will generate.

When the PC is connected to the network the authentication of the PC IP Phone is performed by RADA MAC authentication (steps 102, 103). The VLAN and QoS information is used to connect the PC to the appropriate VLAN with the appropriate QoS.

DHCP snooping is used to detect the IP address of the PC. This IP address is used to provide specific access rules that allow this IP address to talk directly to the IP Phone Exchange unit. Other IP addresses are excluded from talking to the IP Phone Exchange unit to protect the phone system from other data-only PC's.

The network management station can audit the connections made using the table 14T stored in the switch 14 to check that only allowed devices have been connected to the network. It can also display and provide information about where each device and user is on the network. It can also collate the MAC address of a computer directly to the IP address and users name. This information can be used with other management data provided by network devices that only log IP address information (firewalls, web caches, web servers etc) to determine and locate the users that misuse network resources.

This system can operate in conjunction with the simple IP phone system so that a PC IP Phone connected into an IP Phone connected to the network will result in the network port being configured with VOICE VLAN for the IP Phone, "VOICE/DATA VLAN" for the PC and all appropriate authentication and QoS characteristics for both PC and IP Phone.

In some networks the DHCP request and response may go via a different route through the network. Some routers will not see all of these DHCP exchanges (for example if a second DHCP server is used in the arrangement of FIG. 2 on VLAN 1 to provide IP addresses on VLAN 1 the router 12 would not see all these DHCP packets and they are not relayed, the DHCP responses would go direct from this second DHCP server). The management station will know the topology of the network and can determine the switches that don't see all the DHCP responses. The management station can then fill out the dynamic table 14T with additional static entries that it knows are correct thus ensuring that the discard of unauthorised packets does not include any authorised packets. This technique would be used to prevent a user attached to the network core from sending packets to an unauthorised IP address and thus causing additional traffic on the network. The discard of these packets would occur at port 5 of router 12.

The invention is not restricted to the details of the described examples.

The invention claimed is:

1. A computer network having snooping means to monitor and control illegitimate use of the network and to control quality of service (QoS) access of devices to the remainder of the network, said snooping means including:
   at least one switch connecting at least one edge device to the remainder of the network,
   said at least one switch including:
      snooping apparatus using DHCP to monitor signal traffic through the switch to or from each edge device to determine, without changing the signal traffic, for each edge device, a MAC address, an IP address, and a port of the switch to which it is connected; and
      a first dynamic table within said switch of, for each edge device, the MAC address, the IP address, and the port which it is connected, the contents of the first dynamic table being provided by said snooping apparatus; and
   an authentication server which includes a second table of user names and their relevant passwords used by Network Login, in which the second table, which includes User and Password information, also includes, for each user name and password, a corresponding virtual local network (VLAN) membership, VLAN tag and QoS profile traffic classification,
   wherein the user name, VLAN membership, VLAN tag and QoS profile traffic classification obtained from the authentication server and the second table are added to the first dynamic table.

2. The computer network as claimed in claim 1 in which the switch contains a Network Login (802.1x) protocol engine and/or a RADA (RADIUS Authenticated Destination MAC Address) based authentication protocol engine, which protocol engines detect a user name which is added to the dynamic table.

3. A computer network as claimed in claim 1 in which the switch operates in level 2 and/or layer 3 of the OSI model.

4. The computer network as claimed in claim 1 including means wherein the first dynamic table includes entries which are only retained for a predetermined period of time and then discarded.

5. The computer network as claimed in claim 1 in which the IP address is added to the first dynamic table by a DHCP response process.

6. The computer network as claimed in claim 5 in which the first dynamic table which includes MAC addresses and their corresponding IP addresses, for each MAC addresses and corresponding IP addresses includes the virtual local network (VLAN) membership and VLAN tag state, VLAN information being added to the dynamic table by a DHCP response process and applied to the port with required VLAN tagging.

7. The computer network as claimed in claim 6 in which the switch includes a process that is used to automatically interconnect all the ports that are also in the same VLAN.

8. The computer network as claimed in claim 1 in which the information in the first dynamic table of the switch may be accessed by a management apparatus controlling the network.

9. The computer network as claimed in claim 8 in which the switch informs the management apparatus as soon as a user is added to the first dynamic table and passes data on connection time, the MAC and IP address and switch port information about that user.

10. The computer network as claimed in claim 9 further comprising network components that do not require user login to enable access to Web servers, Web Caches and firewalls.

11. The computer network as claimed in claim 10 in which the management apparatus determines and collates IP address information from misuse of any network components and relate this directly to the users of that network that caused the misuse.

12. The computer network as claimed in claim 8 in which the first dynamic table has entries configured by the management apparatus.

13. The computer network as claimed in claim 12 in which the switch processes data packets being passed to the switch to determine a requested IP address of the destination and compares these to the list of IP addresses in the first dynamic table, the packet being discarded if the IP address requested is not in the list of IP addresses in the first dynamic table.

14. The computer network as claimed in claim 1 in which the edge device comprises a work station or a computer.

15. The computer network as claimed in claim 14 in which the edge device runs IP Phone software and be automatically connected to on a mixed voice data network to keep voice traffic separate from a purely data network and the data network separate from a purely voice network.

16. The computer network as claimed in claim 1 in which the edge device comprises an IP phone.

17. The computer network as claimed in claim 15 in which the switch, via the use of the table, controls access of said computer to a predetermined output ports suitable for the purpose.

18. The computer network as claimed in claim 15 in which the switch, via the use of the table, controls access of said IP phone to a predetermined output ports suitable for the purpose.

19. The computer network as claimed in claim 1 in which a data packet is only forwarded to its destination address if its MAC source address and, for an IP packet, its IP source address is contained in the dynamic table.

20. The computer network as claimed in claim 1 in which the first dynamic table of the switch includes a list of allowed DHCP servers, and for any DHCP server response can check the IP address of the DHCP server against this allowed list and prevent access to the network from this IP address if it is not a valid DHCP server.

* * * * *

UNITED STATES PATENT AND TRADEMARK OFFICE
CERTIFICATE OF CORRECTION

PATENT NO. : 7,596,614 B2  Page 1 of 1
APPLICATION NO. : 11/192774
DATED : September 29, 2009
INVENTOR(S) : Saunderson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1006 days.

Signed and Sealed this

Twenty-eighth Day of September, 2010

David J. Kappos
*Director of the United States Patent and Trademark Office*